(12) United States Patent  
Klemm et al.

(10) Patent No.: US 12,454,080 B2
(45) Date of Patent: Oct. 28, 2025

(54) DEVICE FOR PORTIONING AND POSITIONING A FLOWABLE MATERIAL, MACHINE COMPRISING THE DEVICE, AND METHOD FOR PRODUCING A CONTAINER CLOSURE

(71) Applicant: SILGAN HOLDINGS INC., Stamford, CT (US)

(72) Inventors: Helmut Klemm, Braunschweig (DE); Ludwig Kramer, Lathen (DE)

(73) Assignee: SILGAN HOLDINGS INC., Stamford, CT (US)

( * ) Notice: Subject to any disclaimer, the term of this patent is extended or adjusted under 35 U.S.C. 154(b) by 458 days.

(21) Appl. No.: 17/905,820

(22) PCT Filed: Mar. 10, 2021

(86) PCT No.: PCT/IB2021/051981
§ 371 (c)(1),
(2) Date: Mar. 10, 2023

(87) PCT Pub. No.: WO2021/181294
PCT Pub. Date: Sep. 16, 2021

(65) Prior Publication Data
US 2023/0264393 A1    Aug. 24, 2023

(30) Foreign Application Priority Data

Mar. 13, 2020 (DE) .................. 10 2020 106 945.6

(51) Int. Cl.
*B29C 43/18* (2006.01)
*B29C 31/04* (2006.01)
(Continued)

(52) U.S. Cl.
CPC ............ *B29C 43/18* (2013.01); *B29C 31/048* (2013.01); *B29C 43/361* (2013.01);
(Continued)

(58) Field of Classification Search
CPC ..... B29C 31/048; B29C 43/18; B29C 43/361; B29C 48/0022; B29C 70/80; B29L 2031/56; F16J 15/108
See application file for complete search history.

(56) References Cited

U.S. PATENT DOCUMENTS 3,325,035 A     6/1967   Strickman
2016/0129613 A1*  5/2016  Neben ................... B29C 43/021
                                                    156/196
2016/0318212 A1  11/2016  Albonetti

FOREIGN PATENT DOCUMENTS

EP      2294896 A       5/1996
IT      UB20154820      4/2017
(Continued)

OTHER PUBLICATIONS

International Search Report, dated Jun. 14, 2021, from corresponding International Application No. PCT/IB2021/051981.
(Continued)

*Primary Examiner* — Philip C Tucker
*Assistant Examiner* — Jimmy R Smith, Jr.
(74) *Attorney, Agent, or Firm* — HUNTON ANDREWS KURTH LLP

(57) ABSTRACT

Methods and devices for sizing and positioning fluid material, machine comprising the device and method for manufacturing a container closure are disclosed. A device for portioning and positioning a flowable sealing material, the device (100) having a flange-like portion (110) and a cylindrical portion (130), wherein (a) the flange-like portion (110) is connected to the cylindrical portion (130); (b) the cylindrical portion (130) has an end side (133) located at an end of the cylindrical portion (130) that faces away from the flange-like portion (110); and (c) the end side (133) has a face (134) that is inclined relative to an axis of the device
(Continued)

(100) such that an angle (a) between the face (134) and the axis is less than 90°, and the face is inclined upwards and outwards.

15 Claims, 7 Drawing Sheets

(51) Int. Cl.
*B29C 43/36* (2006.01)
*B29C 48/00* (2019.01)
*B29C 70/80* (2006.01)
*B29L 31/56* (2006.01)
*F16J 15/10* (2006.01)

(52) U.S. Cl.
CPC .......... *B29C 48/0022* (2019.02); *B29C 70/80* (2013.01); *F16J 15/108* (2013.01); *B29L 2031/56* (2013.01)

(56) References Cited

FOREIGN PATENT DOCUMENTS

| | | |
|---|---|---|
| WO | 2011023399 A1 | 3/2011 |
| WO | 2015181668 | 12/2015 |
| WO | 2015181668 A1 | 12/2015 |
| WO | 2019038237 | 2/2019 |
| WO | 2019038237 A1 | 2/2019 |

OTHER PUBLICATIONS

Written Opinion of the International Searching Authority, dated Jun. 14, 2021, from corresponding International Application No. PCT/IB2021/051981.

\* cited by examiner

Detail A

DEVICE FOR PORTIONING AND POSITIONING A FLOWABLE MATERIAL, MACHINE COMPRISING THE DEVICE, AND METHOD FOR PRODUCING A CONTAINER CLOSURE

BACKGROUND OF THE INVENTION

Field of the Invention

The present invention relates to devices, machines and methods for producing container closures. In particular, the invention relates to the production of container closures having a sealing element made of a PVC-free material, such as a thermoplastic elastomer (TPE)-based polymer compound.

Description of the Related Art

In the production of a PVC-free sealing element in a container closure, a flowable sealing material, from which the sealing element is to be formed, is introduced into a container closure (carrier). Subsequently, the sealing material is formed, e.g. stamped, so as to create the sealing element.

WO 2015/181668 A1 discloses a machine by means of which a quantity of flowable material can be introduced into a container closure (carrier) in a ring shape.

The machine comprises an inner core element and a wall element, the wall element surrounding the inner core element so that a gap is formed between the core element and the wall element. The flowable material can be fed through the gap. Outside the wall element, a cutting edge is arranged, which, by means of a downward movement, separates a required amount of material from (or at) an outlet of the gap and transfers it to the container closure.

An upward movement of the cutting edge opens the outlet of the gap, so that material can again flow out of the gap outlet.

WO 2019/038237 A1 discloses a similar machine, the end side of the cutting element being here concave in shape.

WO 2011/023399 A1 relates to a method for applying a sealing compound to a closure cap for containers. GB 2 294 896 A describes the molding of a sealing element in a container closure.

SUMMARY OF THE INVENTION

Known machines are unsuitable in particular for press-on twist-off (PT) container closures.

It is the object of the present invention to provide a device that allows to introduce a flowable material into a container closure more easily. In particular, it is intended to allow the flowable material to be introduced into a PT closure more easily.

This object is achieved by a device that can be used in a machine, by a machine or by a method.

A device for portioning and positioning a flowable sealing material has a flange-like portion and a cylindrical portion. The flange-like portion is connected to the cylindrical portion. The cylindrical portion has an end side, the end side being located at an end of the cylindrical portion that faces away from the flange-like portion. The end side has a face that is inclined relative to an axis of the device such that an angle between the face and the axis is less than 90°.

The device may be formed in one piece.

The axis may be defined by the cylindrical portion.

The device may include a metal, in particular the device may include iron. The device may consist of metal (metal alloy).

The face of the device may extend over at least 50% of the end side (of the total surface area of the end side). Especially, the face extends over at least 60% or over at least 70% of the end side. Particularly preferred, the face extends over at least 80% of the end side or over at least 85% of the end side.

The cylindrical portion may be substantially rotationally symmetrical (about the axis). This may relate essentially to functional sections of the cylindrical portion and exclude, for example, holes from the rotational symmetry.

The angle between the face of the end side and the axis may be less than 85°, especially less than 80°, preferably less than 75°, most preferably less than 70°.

The angle between the face of the end side and the axis may also be larger than 20°, in particular larger than 30°, preferably larger than 40°, more preferably larger than 50°, most preferably larger than 60°.

In particular, the angle between the face of the end side and the axis lies between 20° and 85°, more preferably between 30° and 85°, even more preferably between 40° and 80°, especially between 50° and 75°, most preferably between 60° and 70°.

The cylindrical portion may include an inner side, a first outer-side portion and a second outer-side portion.

The second outer-side portion may be angled relative to the first outer-side portion.

The first outer-side portion may have an angle relative to the axis that is different from the angle that the second outer-side portion has relative to the same axis.

The second outer-side portion may be inclined with respect to the axis of the device such that an angle between the axis and the second outer-side portion is at least 0.5°. The angle between the axis and the second outer-side portion may also be at least 1.0°, preferably at least 1.5°, more preferably at least 2.0°, most preferably at least 2.5°.

The angle between the axis and the second outer-side portion can be at most 20.0°. Likewise, the angle between the axis and the second outer-side portion can be at most 15.0°, preferably at most 10.0°, more preferably at most 7.0°, most preferably at most 4.0°.

The angle between the axis and the second outer-side portion may be between 0.5° and 20.0°. The angle between the axis and the second outer-side portion may also be between 1.0° and 15.0°, preferably between 1.5° and 10.0°, more preferably between 2.0° and 7.0°, most preferably between 2.5° and 4.0°.

The first outer-side portion may be configured substantially (±5%) parallel to the axis of the device.

The inner side of the cylindrical portion may be configured substantially (±5%) parallel to the axis of the device.

The end side of the cylindrical portion of the device may have a second face, the second face being located substantially (±5%) perpendicular to the axis of the device.

The second face may (directly) adjoin the inner side of the cylindrical portion.

The end side of the cylindrical portion of the device may be provided with a coating, at least sectionwise.

In particular, the second face of the end side may be fully provided with the coating.

The coating may be a non-stick coating and/or a slide coating. A non-stick coating will reduce the adhesion of a material to the coated surface in comparison with an uncoated surface. A slide coating will reduce friction between the coated surface and a material in comparison with the uncoated surface.

The coating may include or consist of a polymer, in particular a fluoropolymer.

A transition between the end side of the cylindrical portion of the device and the inner side of the cylindrical portion of the device may be sharp-edged.

The face of the end side, which has an angle of less than 90° to the axis of the device, may have a straight contour, when viewed in section. The straight contour may extend over a length of at least 1.0 mm, in particular at least 2.0 mm. The straight contour may have a length of at most 20.0 mm, in particular at most 10.0 mm.

The device can be used in a machine for introducing a flowable sealing material into a container closure. The machine includes an inner element, an outer element and a device of the type described. The outer element surrounds or encloses the inner element such that a gap is formed between the outer element and the inner element. The flowable sealing material can flow in the gap. The gap has an outlet (the gap opens into an outlet), and the flowable sealing material can be discharged from the outlet. By means of a movement of the device (along the axis of the device), in particular relative to the inner element and/or the outer element, sealing material that runs or flows out of the outlet is portioned and positioned in the container closure.

The outer element may enclose or surround the inner element, at least sectionwise.

The device may enclose or surround the outer element, at least sectionwise.

The device and the inner element and/or the outer element may be arranged coaxially.

The gap may be an annular gap.

The sealing material may include a thermoplastic elastomer. In addition, the sealing material may be free from PVC.

In order for the sealing material to be flowable, the sealing material may be heated to a temperature above 100° C.

A machine for introducing a flowable sealing material into an object (container closure) includes an outer element, an inner element and a device. The outer element surrounds the inner element such that a gap is formed between the outer element and the inner element. The flowable sealing material is flowable in the gap. The gap has an outlet, and the flowable sealing material can be discharged from or can flow out of the outlet. The device has an end side. By means of a movement of the device, sealing material that runs or flows out of the outlet is portionable and positionable in the object (container closure). The end side has a face, the face having, when viewed in section, a straight contour (at least sectionwise). The straight contour extends over a length of at least 1.0 mm, preferably at least 2.0 mm.

Any of the devices disclosed herein can be used in the machine.

According to a method, a container closure with a sealing element can be produced. To this end, a container closure is provided. The container closure includes a bottom section and a skirt section. The bottom section includes a horizontal portion and a portion angled relative to the horizontal portion.

From an outlet of a gap between an outer element and an inner element of a machine, flowable sealing material is discharged.

A device having an outer side, an inner side and an end side is moved in an axial direction (axis of the device) relative to the outer element and the inner element. The end side of the device comes into contact with the sealing material discharged from the outlet, the sealing material is stripped from the outlet by the end side of the device and the sealing material is positioned in the container closure. The sealing material is here positioned such that the sealing material will contact at least a portion of the skirt section and at least a portion of the bottom section.

The inner side of the device overlaps the angled portion of the container closure in an axial direction.

Alternatively to or additionally to the axial overlapping, a distance in a radial direction between the outer side of the device and the skirt section of the container closure is at most 2.0 mm.

The skirt section of the container closure may extend substantially (±10° or ±5°) perpendicular to the horizontal portion of the bottom section.

The skirt section of the container closure may extend substantially (±10° or ±5°) parallel to the axial direction of the movement of the device.

The horizontal portion of the bottom section may be perpendicular to the axial direction of the movement of the device.

The inner side (inner surface) may enclose the inner element and/or the outer element at least partially, preferably completely. The overlapping of the angled portion of the container closure by the inner side of the device in an axial direction may be realized by an imaginary line or surface extending the inner side.

The inner diameter of the cylindrical portion of the device may be larger than a diameter of a horizontal portion of the bottom section (lid panel).

The distance in a radial direction between the outer side of the device and the skirt section of the container closure may be the shortest distance in a radial direction between the outer side of the device and the skirt section of the container closure.

Any of the devices disclosed herein can be used in the method.

Likewise, any of the machines disclosed herein can be used in the method.

The container closure may include a second angled portion. The second angled portion may be angled relative to the horizontal portion. Alternatively or additionally, the second angled portion may be angled relative to the (first) angled portion.

The first angled portion of the container closure may adjoin the horizontal portion of the container closure radially outward. Alternatively or additionally, the second angled portion of the container closure may adjoin the first angled portion radially outward.

The second angled portion may (directly) merge into the skirt section of the container closure.

The device, in particular the end side of the cylindrical portion of the device, may overlap the second angled portion of the container closure in an axial direction.

The device, in particular the end side of the cylindrical portion of the device, may overlap (at least sectionwise) the first angled portion as well as the second angled portion of the container closure in an axial direction.

The radial distance between the outer side of the device and the skirt section of the container closure may be at most 1.6 mm, preferably at most 1.4 mm, particularly preferred at most 1.2 mm.

Likewise, the distance in a radial direction between the outer side of the device and the skirt section of the container closure may be at least 0.2 mm, preferably at least 0.4 mm, particularly preferred at least 0.6 mm.

In particular, the distance in a radial direction between the outer side of the device and the skirt section of the container closure may lie between 0.2 mm and 1.6 mm, preferably between 0.4 mm and 1.4 mm, particularly preferred between 0.6 mm and 1.2 mm.

After having been positioned in the container closure, the sealing material may be formed mechanically. By means of such mechanical forming, the sealing material can be formed into the desired shape of a sealing element.

In particular, the sealing material is formed by stamping, after having been positioned in the container closure.

The container closure may be a press-on twist-off container closure.

A press-on twist-off container closure (PT container closure) is pressed onto the mouth of a container (press-on) during the process of closing the container while the sealing element is sufficiently flowable in the heated state. An external thread in the mouth area of a container creates an internal thread (as a negative external thread) in the sealing element area on the skirt of the container closure. The PT container closure is removed from the container by a twisting motion (twist-off).

The container closure may also be a twist-off lug cap.

The container closure may be a metal or plastic container closure.

Likewise, the container closure may be a composite PT container closure. Such a container closure is sold, for example, under the brand name Band-Guard. A plastic thread of the container closure may here cooperate with a mating thread of a container (for example, a glass container having an external thread).

Quite generally, a container closure is to be understood as an object which need not yet be a fully finished container closure. Also a container closure carrier without a sealing element is referred to as a container closure.

According to a method for producing a container closure with a sealing element, a container closure can be provided. The container closure may include a bottom section and a skirt section. The bottom section may include a horizontal portion and a circumferentially extending channel may be formed in the bottom section.

A flowable sealing material can be discharged from an outlet of a gap between an outer element and an inner element of a machine.

A device can be moved in an axial direction relative to the outer element and the inner element. In the course of this movement, an end side of the device can come into contact with the sealing material discharged from the outlet. The sealing material can be stripped from the outlet by the end side of the device (portioning). The sealing material can be deposited in the container closure by the end side of the device (positioning).

During the movement of the device, a portion of the inner element of the machine can abut on a portion of the bottom section of the container closure, and, temporarily (simultaneously), a portion of the device can be located in the circumferentially extending channel.

Alternatively or additionally, a portion of the inner element of the machine can, temporarily during the movement of the device, abut on a portion of the bottom section of the container closure, and (simultaneously) a portion of the device can be located axially below a lower surface of the inner element.

The lower surface of the inner element may face the container closure.

The lower surface of the inner element may be located closer to the end side of the cylindrical portion than to the flange-like portion.

The circumferentially extending channel may be defined by an angled portion of the container closure. The circumferentially extending channel may here be located axially below a horizontal portion of the bottom section of the container closure. In an axial direction, the circumferentially extending channel may be delimited by an imaginary radial extension of a horizontal portion (lid panel) of the bottom section of the container closure.

The channel may be delimited radially between a horizontal portion of the bottom section (lid panel) of the container closure and the skirt of the container closure.

The portion of the device, which is temporarily located in the circumferentially extending channel, may be a portion of the end side of the cylindrical portion of the device.

The portion of the device, which is located temporarily axially below the lower surface of the inner element, may be a portion of the end side of the cylindrical portion of the device.

Any of the devices disclosed herein can be used in the methods[1].

Any of the machines disclosed herein can be used in the method.

The end side of the device may have a first face and a second face. The second face may be substantially (±5%) perpendicular to the axial direction of movement of the device.

1 remark translator
   Ich habe hier, genau nach der deutschen Vorlage ("In den Verfahren"), "Verfahren" im Plural übersetzt ("methods"). Es kommen aber mehrere ähnliche Formulierungen in der Beschreibung vor (s. z.B. den nächsten Satz), bei denen "Verfahren" jeweils im Singular steht.
   I have translated "Verfahren" in the plural ("methods"), exactly according to the German template ("In den Verfahren"). However, there are several similar formulations in the description (see, for example, the next sentence) where "Verfahren" is in the singular in each case.

The second face of the end side of the device may temporarily lie, or be located, entirely in the circumferentially extending channel. The second face of the end side of the device may temporarily lie entirely axially below the lower surface of the inner element, or may be located therebelow.

The portion of the device temporarily located in the circumferentially extending channel may have an axial dimension of at least 0.10 mm, preferably at least 0.20 mm, more preferably at least 0.30 mm.

Likewise, the portion of the device temporarily located below the lower surface of the inner element may have an axial dimension of at least 0.10 mm, preferably at least 0.20 mm, more preferably at least 0.30 mm.

BRIEF DESCRIPTION OF THE DRAWINGS

The embodiments of the present invention are illustrated making reference to examples; however, these examples are not to be understood in a manner in the case of which specific configurations shown in the figures are read into the claims.

DESCRIPTION OF PREFERRED EMBODIMENTS

Figure 1:
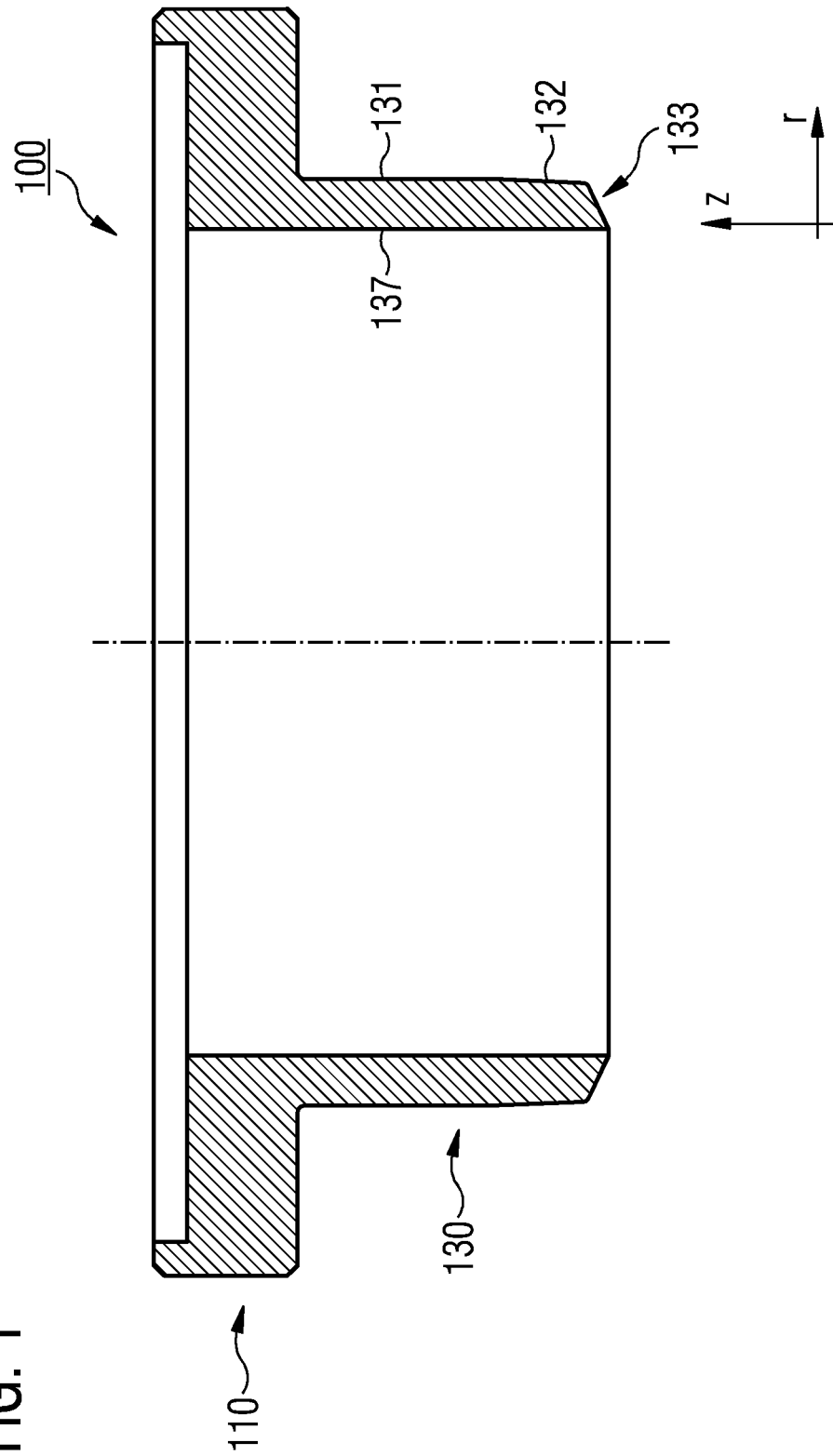
FIG. 1 shows a device 100 in a sectional view in an axial direction.

FIG. 1 shows a device 100 in an axial sectional view. An axis of the device is indicated in the middle (z-direction). The device 100 (which may also be referred to as "cutting bell" although it is not bell-shaped) includes a flange-like first portion 110 and a cylindrical second portion 130. These portions can be oriented at an angle of substantially 90% with respect to each other.

The cylindrical portion 130 includes a first outer-side portion 131 and a second outer-side portion 132. The first outer-side portion 131 and the second outer-side portion 132 may form the outer side of the cylindrical portion.

The cylindrical portion 130 further includes an inner side 137 that is located radially inward (r-direction) relative to the outer side.

An end side 133 is defined between the inner side 137 and the outer side 131, 132 and is formed axially at that end of the cylindrical portion 130 which faces away from the flange-like portion 110.

Figure 2:
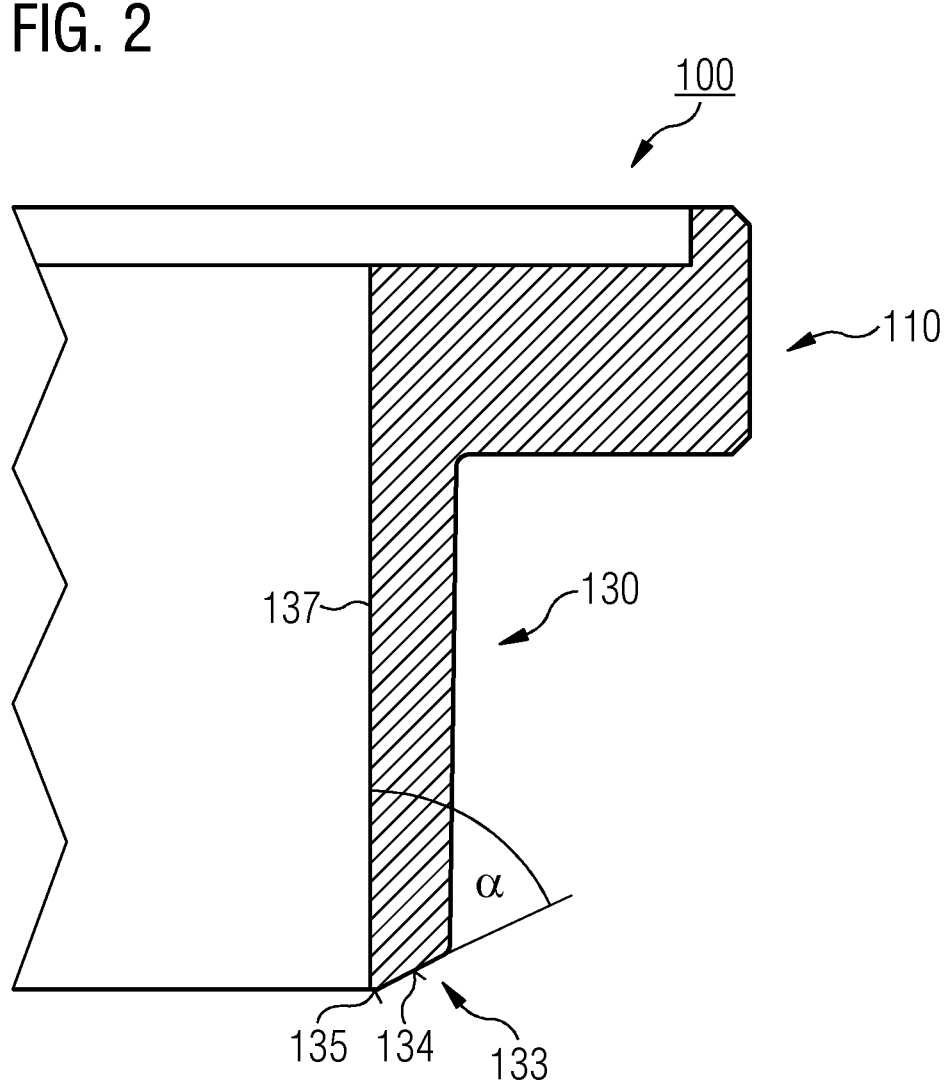
FIG. 2 shows an enlarged representation of a section of the device 100 according to FIG. 1.

FIG. 2 shows an enlarged section of the device 100 according to FIG. 1. The end side 133 of the cylindrical portion 130 includes a first face 134. The end side 133 may include a second face 135.

The first face 134 of the end side 133 is angled, namely relative to the axis (z-direction) of the device 100.

An angle α is formed between the axis of the device 100 (in FIG. 2 substitutionally the inner side 137 of the device 100, which is here parallel to the axis of the device 100) and the first face 134 of the end side 133. Preferably, the angle α is in a range between 60° and 70°, and particularly preferred the angle α is approximately (±1%) 65°.

The second face 135 of the end side 133 is oriented substantially perpendicular to the axis of the device 100 (i.e. also to the inner side 137 of the device 100).

Figure 3:
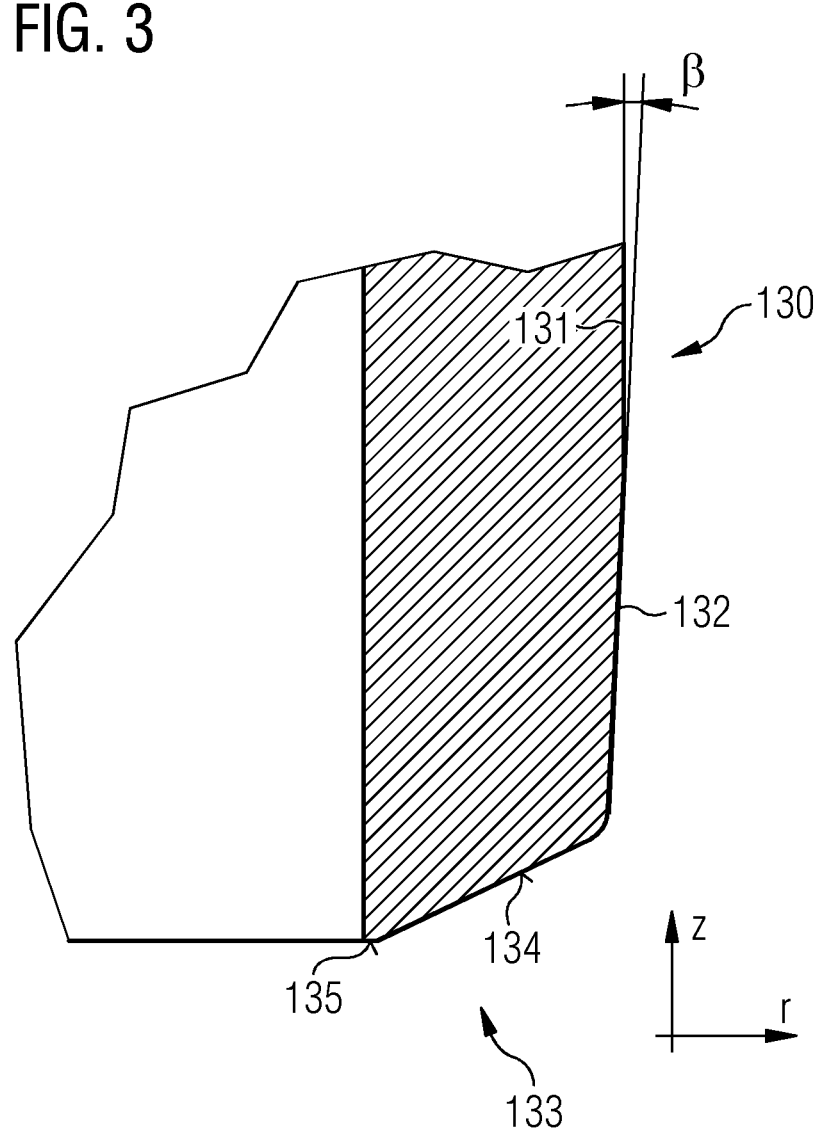
FIG. 3 shows a still further enlarged representation of a section of the device 100 according to FIG. 1.

In FIG. 3, a greatly enlarged section of the cylindrical portion 130 of the device 100 is shown, looking at the end side 133.

Here, the first outer-side portion 131 of the cylindrical portion 130 extends parallel to the axis of the device 100. Between the axis of the device (i.e. here also between the first outer-side portion 131) and the second outer-side portion 132, an angle β (less than 90° and not equal to zero) is formed. The second outer-side portion 132 is thus inclined or angled with respect to the axis of the device 100.

The angle β between the second outer-side portion 132 and the axis of the device 100 may be between 2.5° and 4.0°, in particular the angle β is approximately (±1%) 3°.

With a view to FIGS. 1 to 3, the inner side 137 of the cylindrical portion 130 of the device 100 may be substantially parallel to the axis of the device 100.

The first outer-side portion 131 of the cylindrical portion 130 may be substantially parallel to the axis of the device 100.

The second outer-side portion 132 may be inclined or angled relative to the axis of the device 100.

A first face 134 of the end side 133 of the cylindrical portion 130 may be inclined or angled relative to the axis of the device 100.

The second face 135 of the end side 133 may be substantially perpendicular to the axis of the device 100.

The first face 134 of the end side 133 may directly merge into the second face 135 of the end side 133.

The first outer-side portion 131 may directly merge into the outer-side portion 132.

The second face 135 of the end side 133 may directly merge into the inner side 137 of the cylindrical portion 130. The transition may be sharp-edged.

The second outer-side portion 132 may directly merge into the first face 134 of the end side.

The device 100 may be formed in one piece.

The end side 133 may be provided with a coating, at least sectionwise, so as to facilitate stripping of sealing material, as described hereinbelow. In particular, the second face 135 of the end side 133 is fully provided with a coating, especially a non-stick coating and/or a friction-reducing coating.

Figure 4:
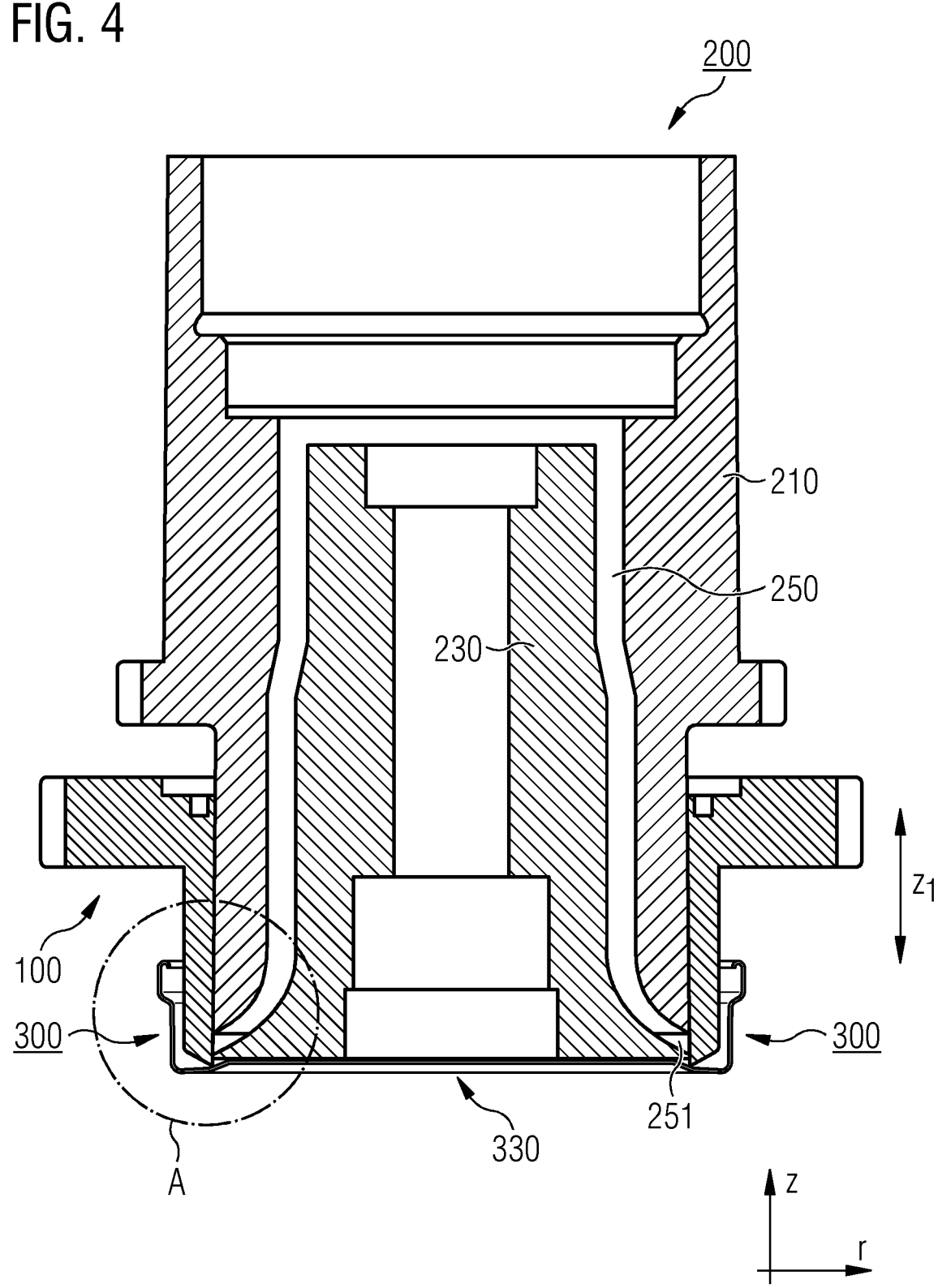
FIG. 4 shows a machine 200 with a device 100.

FIG. 4 schematically shows a machine 200 in axial section.

The machine 200 includes an outer element 210, an inner element 230 and a device 100. The device 100 may be a device 100 described and disclosed herein.

A gap 250 is formed between the outer element 210 and the inner element 230. The gap 250 can be an annular gap, in particular when the functional portions of the outer element 210 and the inner element 230 are substantially rotationally symmetrical. The gap 250 opens into an outlet 251 which, in the view according to FIG. 4, is closed by the device 100.

The device 100 is axially movable (indicated by the double arrow $z_1$ in FIG. 4) relative to the outer element 210 and the inner element 230. An axial movement of the device 100 can be caused by a drive (not shown), e.g. by an electric motor.

When the device 100 is in an axially upper position (the device 100 and the outer element 210 and/or the inner element 230 are coaxial), the outlet 251 of the gap 250 is open.

A flowable sealing material (e.g. a thermoplastic elastomer) can flow in the gap 250 and, when the outlet 251 has been opened by the device 100, it can exit from the outlet 251.

The flowable sealing material can be moved through the gap 250 by an extruder, which may be part of the machine 200, so as to exit from the outlet 251.

Once a predetermined amount of flowable material (sealing material) has exited from the outlet 251, the device 100 can be moved axially downward, so as to strip off the predetermined amount of sealing material from the outlet 251. In the course of this process, the end side of the device 100 comes into contact with the sealing material that has exited the outlet 251. The outlet is the mouth 251 of the channel 250, which has been referred to as gap hereinbefore.

The stripped sealing material is fed towards a container closure 300 by a further downward axial movement of the device 100, so that the stripped sealing material will contact the container closure.

An adhesion between the container closure and the sealing material exceeds an adhesion between the end side of the device 100 and the sealing material, so that the sealing material will remain in the container closure 300 when the device 100 moves axially upward again, so as to open the outlet 251.

The container closure 300 is here arranged relative to the machine 200 such that the sealing material will be positioned advantageously in the container closure.

Figure 5:
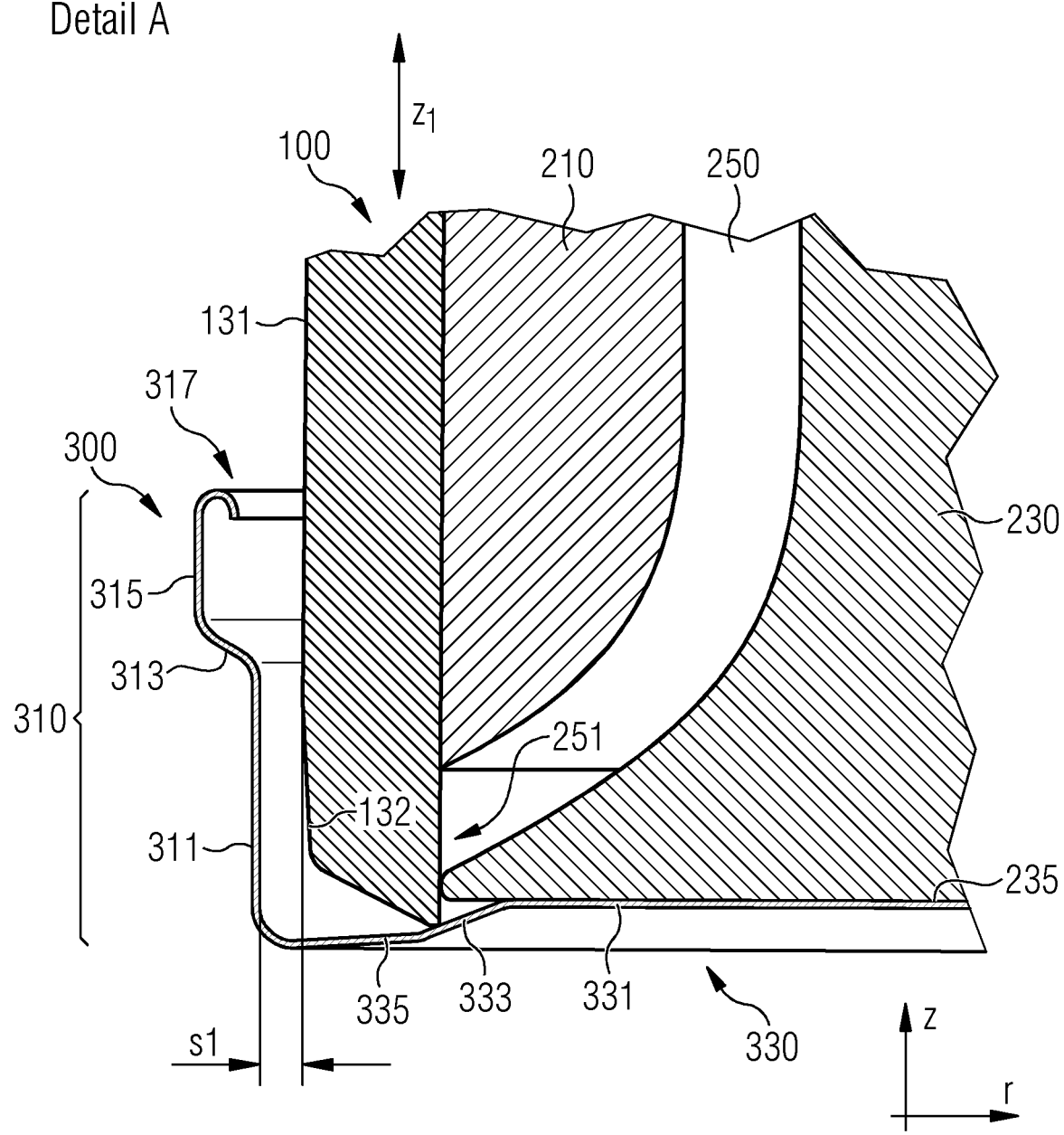
FIG. 5 shows an enlarged representation of the machine 200 according to FIG. 4 with a container closure 300.

An enlarged view of a section of the machine 200 and of the container closure 300 according to FIG. 4 (indicated by the area A in FIG. 4) is shown in FIG. 5.

The container closure 300 includes a skirt section 310 and a bottom section 330.

The bottom section 330 includes a horizontal portion 331, also referred to as a lid panel. The horizontal portion 331 (lid panel) may include a safety button. The safety button may be formed in the lid panel as a horizontal portion.

The bottom section 330 includes a first angled portion 333, located radially outward (in the r-direction). The first angled portion 333 may (directly) adjoin the horizontal portion 331. When, as shown in FIG. 5, the container closure 300 is viewed lying on the bottom section 330, so that the skirt section 310 extends axially upward, the first angled portion 333 may extend axially downward and radially outward (it may be angled axially downward and radially outward) relative to the horizontal surface 331.

The second angled portion 335 of the bottom section 330 may radially (directly) adjoin the first angled portion 333. When the container closure 300 is oriented as shown in FIG. 5 and described hereinbefore, the second angled portion 335 may extend radially outward and axially downward.

The first angled portion 333 of the bottom section 330 may have a different inclination relative to the second angled portion 335, in particular relative to the horizontal portion 331.

Specifically, an angle (less than) 90° between the horizontal portion 331 and the first angled portion 333 is larger than an angle (less than) 90° between the horizontal portion 331 and the second angled portion 335. In other words, the inclination from the horizontal of the first angled portion 333 may be greater than the inclination from the horizontal of the second angled portion 335.

The skirt section 310 adjoins the bottom section 330 of the container closure 300, in particular along a radius.

The skirt section includes a first axial (vertical or perpendicular) portion 311. The first axial portion 311 may be oriented substantially parallel to the axis of the container closure 300, or oriented substantially perpendicular to the horizontal surface 331 of the bottom section 330.

The first axial portion 311 may merge into a second axial (vertical or perpendicular) portion 315 of the skirt section 310 via an angled portion 313 of the skirt section 310.

The angled portion 313 of the skirt section 310 extends radially outward and axially upward (in the orientation of the container closure 300 as shown in FIG. 5 and described hereinbefore).

The first axial portion 311 of the skirt section 310 may be located radially inward relative to the second axial portion 315. The diameter of the container closure 300 may thus be smaller in the area of the first axial portion 311 than the diameter of the container closure 300 in an area of the second axial portion 315.

The first axial portion 311 may merge (directly) into the angled portion 313 of the skirt section 310. The second axial portion 315 may (directly) adjoin the angled portion 313 of the skirt section 310.

The second angled portion 335 of the bottom section 330 may (directly) merge into the first axial portion 311 of the skirt section 310, in particular via a radius.

The skirt section 310 may include a curl 317. The curl 317 may be formed on an axial end of the skirt section 310. The curl 317 may be an inward curl. The curl 317 may thus be oriented radially inward.

A gap 250 is formed between the outer element 210 and the inner element 230 of the machine 200. The gap 250 opens into the outlet 251, the outlet area of the gap 250 being oriented radially outward and axially downward.

During the production of the container closure 300 (introduction of a sealing material and forming of the material into a sealing element), the bottom section 330 of the container closure 300, in particular the horizontal surface (horizontal portion) 331, may abut on a portion, in particular an axial lower surface 235, of the inner element 230 of the machine 200.

Between the outer side 131, 132 of the device 100 and the skirt section 310, there is a distance s1. In particular, the distance s1 is the smallest distance between the outer side 131, 132 of the device 100 and the skirt section 310. The distance s1 may be defined between the first outer portion 131 of the device 100 and the first axial portion 311 of the skirt section 310.

The distance s1 can be viewed[2] (exclusively) in a radial direction.

Figure 6:
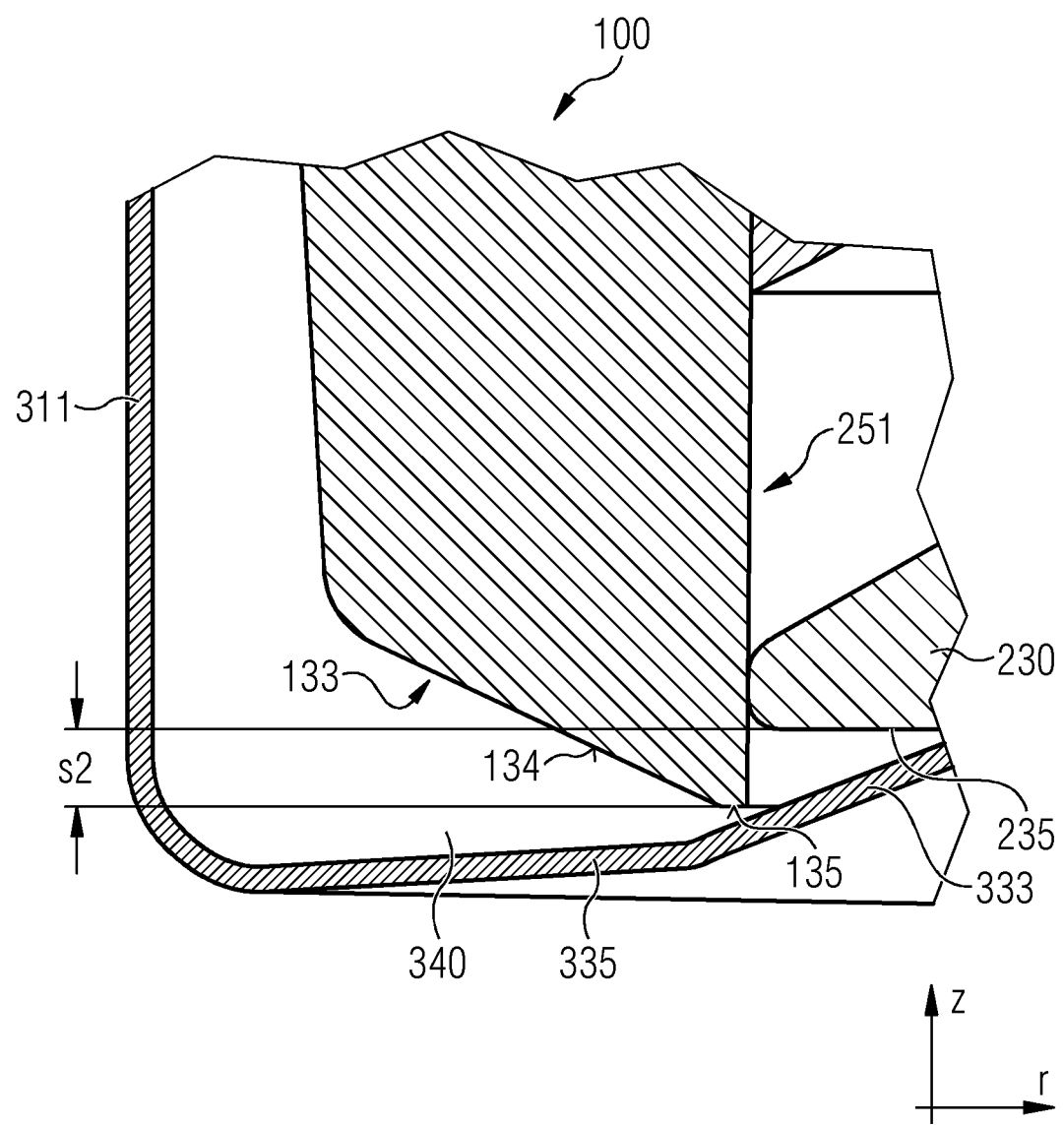
FIG. 6 shows a still further enlarged representation of a section of the machine 200 according to FIG. 4.

FIG. 6 shows a still further enlarged representation of the section A according to FIG. 4.

A channel 340 may be formed in the bottom section 330 of the container closure 300.

The channel 340 may be configured completely circumferentially. The channel 340 may be located between the horizontal surface (horizontal portion) 331 of the bottom section 330 and the first axial portion 311 of the skirt section 310.

The channel 340 may be formed by the first angled portion 333 and by the second angled portion 335 of the bottom section 330.

In FIG. 6 (cf. also FIGS. 4, 5 and 7), the device 100 is in an axially lowermost position relative to the outer element 210 and relative to the inner element 230 of the machine 200. At this position, the sealing material (cf. also FIG. 7 in this respect) is positioned in the container closure 300 before the device 100 is moved axially upward so as to open the outlet 251 of the gap 250.

The end side 133 of the device 100 overlaps the first angled portion 333 of the bottom section 330 in an axial direction. The end side 133 of the device 100 may also (additionally or alternatively) overlap the second angled portion 335 of the bottom section 330 in an axial direction.

The device 100 can be moved downward relative to the outer element 210 and the inner element 230 to such an extent that a portion of the device 100 is located axially below the lower surface 235 of the inner element 230. This is temporarily the case during the movement of the device 100. In particular, a portion of the end side 133 is located axially below the lower surface 235 of the inner element 230. Preferably, the second face 135 of the end side 133 is located (axially) completely below the lower surface 235 of the inner 2 Remark translator Ich bin mir nicht sicher, wie "betrachtet" ("viewed", "seen"?) hier zu verstehen ist.

I am not sure how "viewed" is to be understood here.
element 230. This is the case at the position of the device 100 relative to the machine 200 as shown in FIG. 6.

Between the lower surface 235 of the inner element 230 and a portion of the end side 133 of the device 100, an axial distance s2 may temporarily be defined during the movement of the device 100. The portion of the end side 133 may here be located axially below the lower surface 235 of the inner element 230.

The channel 340 in the bottom section 330 of the container closure 300 may be delimited axially upward by an imaginary extension of the horizontal surface 235 of the bottom section 330.

At the position of the device 100 as shown in FIG. 6, a portion of the device 100 is located in the channel 340. Especially, a portion of the end side 133 of the device 100 is located in the channel 340 (temporarily during the movement of the device 100). In particular, the second surface of the end side 133 is located entirely within the channel 340.

Figure 7:
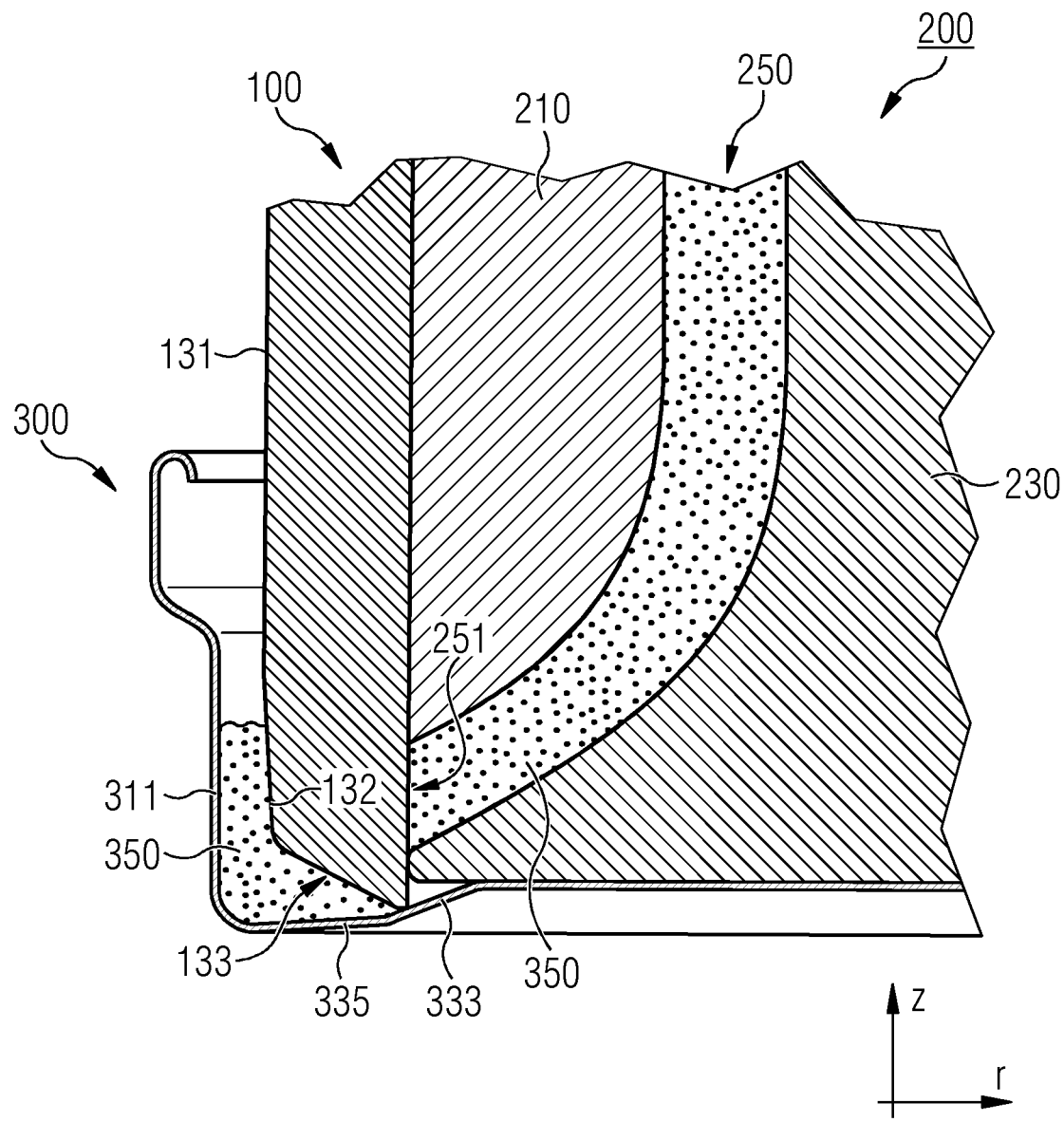
FIG. 7 shows the machine 200 in the representation according to FIG. 5 with sealing material 350.

FIG. 7 illustrates how a flowable sealing material is positioned in the container closure 300 by the machine 200.

The flowable sealing material 350 has been moved in the gap 250 between the outer element 210 and the inner element 230 towards the outlet 251. While the device 100 was positioned relative to the outer element 210 and the inner element 230 such that the outlet 251 was open, a quantity of the flowable sealing material 350 flowed out of the outlet 251. By means of an axial downward movement of the device 100 relative to the outer element 210 and the inner element 230 (to the axially lowermost position), the sealing material 350 was stripped from the outlet 251 and positioned axially downward in the container closure 300, in the way indicated in FIG. 7.

The geometry of the end side 133 of the device 100 and the outer side 131, 132 preforms the sealing material 350 in the container closure 300. In particular, the sealing material 350 is given shape by the end side 133 of the device 100 and by the second outer-side portion 132.

When the device 100 moves axially upward relative to the outer element 210 and the inner element 230, the sealing material 350 preformed in the container closure 300 remains in the container closure substantially in the preformed shape.

The sealing material 350 may be formed fully circumferentially in the container closure 300, in particular in the form of a circular ring.

After the sealing material 350 has been preformed in the container closure 300, the sealing material 350 contacts a portion of the bottom section 330 of the container closure 300 and a portion of the skirt section 310 of the container closure 300.

Especially, the sealing material 350 contacts, after having been preformed, a portion of the first axial portion 311 of the skirt section 310 (partially), a portion of the second angled portion 335 of the bottom section 330 (fully), and a portion of the first angled portion 333 of the bottom section 330 (partially).

After the preforming of the sealing material 350 in the container closure 300, the sealing material 350 can be formed mechanically into a final shape, so that a sealing element will be formed in the container closure 300. The forming of the sealing element is especially accomplished by stamping.

Generally, the outer diameter of the container closure 300 may be between 20 mm and 120 mm, preferably between 30 mm and 100 mm, more preferably between 40 mm and 80 mm.

What is claimed is:

1. A device for portioning and positioning a flowable sealing material, the device comprising a flange portion and a cylindrical portion, wherein:
    (a) the flange portion is connected to the cylindrical portion;
    (b) the cylindrical portion has an end side located at an end of the cylindrical portion that faces away from the flange portion; and
    (c) the end side has a face that is inclined relative to an axis of the device such that a first angle between the face and the axis is less than 90°, and the face is inclined from an interior side of the cylindrical portion outward and upward toward the flange portion.

2. The device according to claim 1, wherein the face extends over at least 50% of the end side.

3. The device according to claim 1, wherein the cylindrical portion is substantially rotationally symmetrical.

4. The device according to claim 1, wherein the angle between the face of the end side and the axis is less than 85°.

5. The device according to claim 1, wherein the angle between the face of the end side and the axis is larger than 20° and less than 90°.

6. The device according to claim 1, wherein the cylindrical portion has an inner side, a first outer-side portion and a second outer-side portion.

7. The device according to claim 6, wherein the second outer-side portion is inclined with respect to the axis of the device such that a second angle between the axis and the second outer-side portion is at least 0.5°.

8. The device according to claim 6, wherein a second angle between the axis and the second outer-side portion is at most 20.0°.

9. The device according to claim 6, wherein the first outer-side portion is configured substantially parallel to the axis of the device.

10. The device according to claim 6, wherein the inner side is configured substantially parallel to the axis of the device.

11. The device according to claim 6, wherein the end side has a second face located substantially perpendicular to the axis of the device.

12. The device according to claim 11, wherein the second face adjoins the inner side of the cylindrical portion.

13. The device according to claim 11, wherein the end side is provided with a coating, at least sectionwise.

14. The device according to claim 6, wherein a transition between the end side and the inner side of the cylindrical portion is sharp-edged.

15. The device according to claim 1, wherein the face has a straight contour, when viewed in section, that extends over a length of at least 1.0 mm.

* * * * *